(12) United States Patent
Posch et al.

(10) Patent No.: US 8,780,240 B2
(45) Date of Patent: Jul. 15, 2014

(54) METHOD FOR THE GENERATION OF AN IMAGE IN ELECTRONIC FORM, PICTURE ELEMENT (PIXEL) FOR AN IMAGE SENSOR FOR THE GENERATION OF AN IMAGE AS WELL AS IMAGE SENSOR

(75) Inventors: Christoph Posch, Bad Fischou (AT); Martin Litzenberger, Bruck an der Leitha (AT); Daniel Matolin, Vienna (AT); Rainer Wohlgenannt, Vienna (AT)

(73) Assignee: AIT Austrian Institute of Technology GmbH, Vienna (AT)

( * ) Notice: Subject to any disclaimer, the term of this patent is extended or adjusted under 35 U.S.C. 154(b) by 1357 days.

(21) Appl. No.: 12/312,679

(22) PCT Filed: Nov. 22, 2007

(86) PCT No.: PCT/AT2007/000526
§ 371 (c)(1),
(2), (4) Date: Dec. 22, 2009

(87) PCT Pub. No.: WO2008/061268
PCT Pub. Date: May 29, 2008

(65) Prior Publication Data
US 2010/0182468 A1    Jul. 22, 2010

(30) Foreign Application Priority Data

Nov. 23, 2006 (AT) ................................ A 1940/2006

(51) Int. Cl.
*H04N 5/335* (2011.01)
(52) U.S. Cl.
USPC ............ 348/294; 348/295; 348/296; 348/297
(58) Field of Classification Search
USPC .............. 348/154, 155, 207.99, 208.1, 208.3, 348/208.4, 208.5, 208.14, 135, 215.1, 348/220.1, 221.1, 222.1, 229.1, 230.1, 241, 348/272, 294, 295, 296, 297
See application file for complete search history.

(56) References Cited

U.S. PATENT DOCUMENTS

| | | | |
|---|---|---|---|
| 5,565,915 A | 10/1996 | Kindo et al. | |
| 5,650,643 A | 7/1997 | Konuma | |
| 6,253,161 B1 | 6/2001 | Arias-Estrada | |
| 6,587,145 B1 | 7/2003 | Hou | |
| 6,642,503 B2 | 11/2003 | Kummaraguntla et al. | |
| 6,660,989 B2 | 12/2003 | Guo et al. | |
| 7,105,793 B2* | 9/2006 | Rhodes | 250/208.1 |
| 7,518,645 B2 | 4/2009 | Farrier | |
| 2005/0041124 A1* | 2/2005 | Sugiyama et al. | 348/294 |
| 2007/0109433 A1* | 5/2007 | Yamada et al. | 348/294 |
| 2009/0268067 A1* | 10/2009 | Sugiyama et al. | 348/294 |

OTHER PUBLICATIONS

P. Lichtsteiner et al., "A 64×64 AER Logarithmic Temperal Derivative Silicon Retina" in Research in Microelectronics and Electronics, 2005, PHD, vol. 2. Jul. 2005, pp. 202-205.
C. Xu et al., "A New Digital-Pixel Architecture for CMOS Image Sensor with Pixel-level ADC and Pulse Width Modulation Using a 0.18 μm CMOS Technology," 2003 IEEE Conference on Electron Devices and Solid-State Circuits, Dec. 16-18, 2003, pp. 265-268.
X. Qi et al., "SNR and FPN Considerations for Time-based Wide Dynamic Range CMOS Image Sensors" 6th World Multiconference on Systems; Cybernetics and Informatics, Jul. 14-18, 2002, pp. 66-73.
E.R. Fossum, "CMOS Image Sensors: Electronic Camera-on-a-Chip," IEEE Transactions on Electron Devices, vol. 44, No. 10, Oct. 1997, pp. 1689-1698.
P. Lichtsteiner et al., "A 128×128 120dB 30mW Asynchronous Vision Sensor that Responds to Relative Intensity Change," 2006 IEEE Int. Solid-State Circuits Conf., Digest of Technical Papers, Feb. 2006, pp. 2060-2069.
A. Bermak, "A CMOS Imager with PFM/PWM Based Analog-to-Digital Converter," IEEE Int. Symposium on Circuits and Systems, 2002, pp. 53-56.
S. Chen et al, "A Low Power CMOS Imager Based on Time-to-First-Spike encoding and Fair AER," 2005 IEEE Int. Symposium on Circuits and Systems, vol. 5, May 2005, pp. 5306-5309.
S. Chen et al., "A Second Generation Time-to-First-Spike Pixel with Asynchronous Self Power-Off," 2006 IEEE Int. Symposium on Circuits and Systems, May 2006, pp. 2289-2292.
E. Culurciello et al., "Arbitrated Address Event Representation Digital Images Sensor," 2001 IEEE Solid State Circuits Conference, pp. 92-93.

E. Culurciello et al., "A Biomorphic Digital Image Sensor," IEEE J. of Solid-State Circuits, vol. 38, No. 2, Feb. 2003, pp. 281-294.

A. Kitchen et al., "PWM Digital Pixel Sensor Based on Asynchronouse Self-Resetting Scheme," IEEE Electron Device Letters, vol. 25, No. 7, Jul. 2004, pp. 471-473.

L. Qiang et al., "A Time-Based CMOS Image Sensor," Proceedings of 2004 Int. Symposium on Circuits and Systems, vol. 4, May 2004, pp. 840-843.

Q. Xin et al., "A Time-to-First Spike CMOS Imager," Proceedings of 2004 Int. Symposium on Circuits and Systems, vol. 4, May 2004, pp. 824-827.

P.J.W. Noble, "Self-Scanned Silicon Image Detector Arrays," IEEE Transactions on Electron Devices, vol. ED-15, Nov. 4, Apr. 1968, pp. 202-209.

S.G. Chamberlain, "Photosensitivity and Scanning of Silicon Image Detector Arrays," IEEE J. of Solid-State Circuits, vol. 4, No. 6, Dec. 1960, pp. 333-369.

K.A. Boahen et al., "Point-to-Point Connectivity Between Neuromorphic Chips Using Address Events," IEEE Transactions on Circuits and Systems-II: Analog and Digital Signal Processing, vol. 47, No. 5, May 2000, pp. 416-434.

K.A. Boahen et al., "A Burst-Mode Word-Serial Address-Event Link-I: Transmitter Design," IEEE Transactions on Circuits and Systems-I: Regular Papers, vol. 51, No. 7, Jul. 2004, pp. 1269-1280.

Y. Sugiyama et al., "A High-Speed CMOS Image Sensor with Profile Data Acquiring Function," IEEE J. of Solid-State Circuits, vol. 12, Dec. 2005, pp. 2816-2833.

\* cited by examiner

*Primary Examiner* — Twyler Haskins
*Assistant Examiner* — Peter Chon
(74) *Attorney, Agent, or Firm* — Dykema Gossett PLLC (57) ABSTRACT

A method for continuously generating a (grayscale) map of a scene in electronic form, characterized by high time resolution and minimal data volume, is presented. The method involves repeated measurement of the instantaneous exposure of the image elements in an image sensor, the start of every exposure measurement being determined autonomously and asynchronously by every image element independently, and hence the redundancy which is typical of synchronous image sensors in the image data to be transmitted being largely suppressed.

The stimulation for the purpose of exposure measurement is provided by the autonomous detection of a relative light intensity change in the scene detail which the image element views, by the transient detector in the respective image element. To increase the signal-to-noise ratio and the dynamic range, the exposure measurement is preferably performed on the basis of time, that is to say the exposure of an image element is represented by the period between two asynchronous events.

The address of the image element, corresponding to the coordinates of the image element in the sensor array, is transmitted asynchronously at the time of every detection of a light intensity change for the purpose of storage and/or further processing. In addition, the result of the resultant exposure measurement is likewise transmitted together with the address of the image element, asynchronously for the purpose of storage and/or further processing.

No external control signals are required for controlling timing, particularly for the exposure measurement. The image sensor is typically implemented in CMOS technology.

20 Claims, 5 Drawing Sheets

METHOD FOR THE GENERATION OF AN IMAGE IN ELECTRONIC FORM, PICTURE ELEMENT (PIXEL) FOR AN IMAGE SENSOR FOR THE GENERATION OF AN IMAGE AS WELL AS IMAGE SENSOR

BACKGROUND OF THE INVENTION

1. Field of the Invention

The invention relates to a method for the generation of a map of a scene in electronic form by picture elements (pixels), further a picture element (pixel) for an image sensor for the generation of an image with a device for exposure measurement, and an image sensor for the generation of an image in electronic form with a multiplicity of picture elements (pixels).

2. The Prior Art

Classical image processing is based on the evaluation of data delivered by an image sensor system in the form of frames. Conventional, clocked image sensors acquire the visual information from the scene either sequentially for each pixel or each pixel line/column or, in various patterns, pixel parallel, but always time-quantized at some frame rate. Each frame of data that is recorded, transmitted, and needs to be post-processed in some fashion, carries the information from all pixels, regardless of whether or not this information has changed since the last frame had been acquired, usually not long ago (e.g. Fossum E. R., "CMOS image sensors: Electronic Camera-On-A-Chip", Electron Devices, IEEE Transactions on, Vol. 44, Iss. 10 pp. 1689-1698, October 1997). This method obviously leads, depending on the dynamic contents of the scene, to a high degree of redundancy in the image data. The problem worsens as modern image sensors advance to ever higher spatial and temporal resolution. The hardware required for post-processing of the data increases in complexity and cost, demand on transmission bandwidth and data storage capacity surges and the power consumption rises to levels that can become prohibitive, especially considering today's mobile, battery-powered applications.

For some years image sensor architectures have been studied that perform preprocessing of the visual information directly at the sensor plane, usually parallel in all pixels ("focal plane processing"). Some of these sensors send the pre-processed image information asynchronously and event-controlled, i.e. independently of external timing control (e.g. clock, shutter, reset), and only when relevant information in the scene has been detected.

In the special case of the optical transient sensor, or dynamic vision sensor (DVS), the relevant information are changes in lighting intensity received by the individual, autonomously operating pixels. The electronic circuit, "transient detector", which is the basis for these pixels, was first reported in Lichtsteiner, P.; Delbruck, T., "A 64×64 AER logarithmic temporal derivative silicon retina," Research in Microelectronics and Electronics, 2005 PhD, vol. 2, no., pp. 202-205, 25-28 Jul., 2005, and Lichtsteiner, P.; Posch, C.; Delbruck, T., "A 128×128 120 dB 30 mW asynchronous vision sensor that responds to relative intensity change," Solid-State Circuits, 2006 IEEE International Conference, Digest of Technical Papers, pp. 2060-2069, Feb. 6-9, 2006, and is described in WO 2006/128315 A1.

Pixels that do not sense changes in their field of view produce no data. As a result, depending on the dynamic contents of the scene, the amount of generated data is substantially reduced as compared to conventional image sensors, which read out their entire pixel field at a constant rate, regardless of whether or not this information has changed since the last time the frame was read out.

Since changes of light intensity are usually caused by a variation in reflectance of objects in the scene, object movements are the common cause for these changes. In the data stream delivered by the sensor, only information about variable objects is contained and there are no data on homogeneous surfaces or motionless background (i.e. no conventional image data in the form of gray-level information). Since the individual pixels react asynchronously and with low latency to stimuli in their field of vision, no time quantization takes place and a high temporal resolution can be achieved. For many applications in the field of machine vision, such as automotive, surveillance, industrial automation, etc., the data delivered by a transient sensor are very well suited.

The one main restrictive feature of the described optical transient sensors is its inability to produce an intensity/grayscale image. This issue constitutes a severe limitation because many vision applications, also machine or computer vision, require information about immovable (or constant) objects or about the scene background. In addition, if human observers or operators are applied, a video picture of the regarded scene is often indispensable.

The disadvantages of conventional, clocked CMOS or CCD image sensors are, as already mentioned, the limitation of temporal resolution to the frame rate at which the pixel field is read out, the quantity of highly redundant data produced and the generally low dynamic range.

The problem to be solved by the present invention is to provide a method and an apparatus for the continuous acquisition of the full visual information of an observed dynamic scene with high temporal and intensity resolution over a wide dynamic range (of recordable and processable light intensity), and thereby generating the minimum necessary amount of data volume. Thus, the generated data are not to consist of a succession of image frames, but an asynchronous stream of change and intensity information of individual pixels, which are recorded and transmitted only if an actual change in the field of view of the individual pixel has been detected by the pixel itself. This method leads to a substantial reduction in generated data through complete suppression of the temporal redundancy in the picture information that is typical for conventional image sensors, though with the data containing the same, or even higher, information content. The picture element for an image sensor that implements the aforementioned method (being one subject of the present invention) as well as the required asynchronous data readout mechanism can be realized on basis of analog electronic circuits. An image sensor with a multiplicity of such picture elements is typically realized and fabricated as an integrated system-on-chip, e.g., in CMOS technology.

SUMMARY OF THE INVENTION

The proposed method is characterized by the fact that an exposure measurement at one pixel by means of a first photoreceptor is stimulated by the event of an independent, asynchronous detection of a change of light intensity in the field of view of the picture element by a second photoreceptor of that same picture element, and that the result of this measurement as well as the x,y-address of the picture element in the sensor array, is asynchronously transferred for storage and/or processing. After each pixel of the sensor has, at least once, detected a change and thus has executed an exposure measurement, an image (grayscale/color) of the entire scene is present in digital form in a bit-map memory. Subsequently, only pixels which detect changes of light intensity in their field of view send new updated grayscale values (and not all pixels at given times, independently of whether new information is present or not). For pixels; which do not detect a change of light intensity, i.e., see an unchanged light intensity, no grayscale value actualization is necessary and no data are transmitted. Depending upon the dynamic contents of the regarded scene, a substantial reduction in the generated data volume is obtained by this method as compared to a clocked (synchronous) image sensor. As a result, a complete (greyscale) image of the regarded scene is present in the bit-map memory at all times and is constantly updated at high temporal resolution and (relatively) low data rate. The image information can be taken from the bit-map memory at any time, independently of the image acquisition operation, at arbitrary repetition rates. Also the sparse image information can be streamed to remote data receivers using low-bandwidth data links.

According to the preferred embodiment of the invention, the beginning of one exposure measurement in one picture element is triggered by a circuit in the picture element detecting a change in light intensity (transient detector), and the end of the exposure measurement is determined by a light dependent physical quantity in the same picture element reaching an adjustable threshold value. At both instants in time, beginning and end of the exposure measurement, the array x,y-address of the picture element is transmitted asynchronously. The time period between the two (asynchronous) events encodes the instantaneous exposure information of the pixel, so implementing an asynchronous, time-based image sensor. The exposure-dependent physical quantity in the picture element is preferably the electrical voltage at the integration capacitor of an integrating photoreceptor circuit. The method according to the present invention relates to the field of time-based image sensing but does not require any pixel- or sensor-external timing signals, in particular to control the exposure measurement.

Fundamental concepts and methods concerning "time-based image sensors" are described in the following publications:

Bermak, "A CMOS imager with PFM/PWM based analog-to-digital converter", *Circuits and Systems, 2002. ISCAS 2002. IEEE International Symposium on*, 2002;

Chen S.; Bermak, A., "A low power CMOS imager based on time-to-first-spike encoding and fair AER," *Circuits and Systems, 2005. ISCAS 2005. IEEE International Symposium on*, pp. 5306-5309 Vol. 5, 23-26 May 2005;

Chen S.; Bermak, A., "A Second Generation Time-to-First-Spike Pixel with Asynchronous Self Power-off," *Circuits and Systems, 2006. ISCAS 2006. Proceedings. 2006 IEEE International Symposium on*, pp. 2289-2292, 21-24 May 2006;

Culurciello, E.; Etienne-Cummings, R.; Boahen, K., "Arbitrated address-event representation digital image sensor," *Electronics Letters*, vol. 37, no. 24 pp. 1443-1445, 22 Nov. 2001;

Culurciello, E.; Etienne-Cummings, R.; Boahen, K. A., "A biomorphic digital image sensor," *Solid-State Circuits, IEEE Journal of*, vol. 38, no. 2 pp. 281-294, February 2003;

J. G. Harris, X. Qi, Q. Luo and X. Guo, "SNR and FPN considerations for time-based wide dynamic range CMOS image sensors", *6th World Multiconference on Systemics, Cybernetics and Informatics*, Jul. 14-18, 2002;

Kitchen, A.; Bermak, A.; Bouzerdoum, A., "PWM digital pixel sensor based on asynchronous self-resetting scheme," *Electron Device Letters, IEEE*, vol. 25, no. 7 pp. 471-473, July 2004;

Qiang Luo; Harris, J. G., "A time-based CMOS image sensor," *Circuits and Systems, 2004. ISCAS '04. Proceedings of the 2004 International Symposium on*, vol. 4, IV-840-3 Vol. 4, 23-26 May 2004;

Xin Qi; Xiaochuan Guo; Harris, J. G., "A time-to-first spike CMOS imager," *Circuits and Systems, 2004. ISCAS '04. Proceedings of the 2004 International Symposium on*, vol. 4, IV-824-7 Vol. 4, 23-26 May 2004;

Chen Xu; Chao Shen; Bermak, A.; Mansun Chan, "A new digital-pixel architecture for CMOS image sensor with pixel-level ADC and pulse width modulation using a 0.18 µm CMOS technology," *Electron Devices and Solid-State Circuits, 2003 IEEE Conference on*, pp. 265-268, 16-18 Dec. 2003;

and in U.S. Pat. Nos. 6,660,989; 6,069,377; 6,642,503; 5,650,643; 5,565,915 and U.S. Pat. No. 6,587,145.

All methods described in these publications differ substantially from the method of the present invention, as there is, e.g., a common exposure cycle for the entire pixel field ("frame"), or at least line- or column-wise (e.g. "rolling shutter mode"), triggered externally using a global "START" or "RESET" signal, or, according to another approach, the single pixel intensity information is encoded as "interspike intervals" of continuous "Request-Acknowledge-RESET-Integrate" cycles.

In order to suppress exposure measurement inaccuracies due to, e.g., comparator voltage offsets or noise, it is preferably foreseen that, after reaching a first voltage level at the beginning of the exposure measurement integration, the address of the picture element is transmitted, and that subsequently, with reaching a second voltage level, the address of this picture element is again transmitted, and that the time difference between the times of reaching the two different voltage levels is used as a measure for the exposure of the picture element.

In all variants the information about the detection of a change of light intensity and about the exposure measurement can be transmitted concurrently and independently of each other.

An essential feature of the invention consists in the fact that the exposure measurement at a picture element can be initiated by a change of light intensity at this same picture element, whereby the event of detection of the light intensity change can also be signaled by transmitting the address of the picture element via a separate data transmission channel.

In accordance with a further embodiment of the invention, a voltage level at the picture element after integration (exposure measurement) over a given period of time can be used as measure for the exposure of the picture element. The point in time for starting the exposure measurement is, as before, determined autonomously and asynchronously by the picture element's change detector.

It can be advantageous that the triggering of the exposure measurement is commonly enabled or disabled for a group of picture elements. For example, parts of the pixel array are switched off, within which the monitoring of changes of light intensity and transmission of related information is sufficient for the application and no intensity data are required. The gain is a further reduction in data volume to be transmitted and processed.

In similar way it can be also advantageous if the ability of detection of changes of light intensity for a group of picture elements is enabled or disabled.

The method described so far can be further improved if at least at one arbitrary point in time a reference exposure measurement in at least one picture element can be initiated externally. An image sensor composed of a multitude of said picture elements delivers a complete image with grayscale values for all picture points only after a period of time that depends on the dynamic contents of the regarded scene. This stems from the fact that picture elements which do not detect a change in their field of view do not execute an exposure measurement. Hence it is advantageous to be able to trigger an exposure measurement at an arbitrary point in time in some or all picture elements for recording a complete image from a static scene. Furthermore this functionality is advantageous since for the optimal definition of the parameters for the transformation of the time information into picture grayscale values by the post-processing unit, the knowledge of the light intensity range of the entire scene is necessary.

In this context it can be favorable that the exposure measurement is initiated essentially at the same time in the first picture element of all parallel lines of picture elements, and that at the end of the exposure measurement of said first picture element, and transmission of the related data, the exposure measurement at the next picture element of the same line is initiated, and so on. Alternatively, the exposure measurement could be initiated essentially at the same time in all picture elements in an arbitrary pattern, preferably a contiguous array.

Advantageously said reference exposure measurement can be executed concurrently to and independently of the detection of changes of light intensity by the picture elements and associated initiation of exposure measurements.

An efficient implementation resulting in a reduction in silicon area requirements for the individual picture element can be obtained by executing the external initiation of the exposure measurement in a single picture element by stimulating the entire row and column containing the picture element and implementing a logical "AND" gating of the trigger signal in the picture element.

An image sensor capable of implementing said method can be constructed with a multitude of said picture elements. A bit map memory with the number of memory cells corresponding to the number of picture elements in the sensor, in which the results of the current exposure measurement for each pixel is stored, can be realized on the same substrate ("chip") as the image sensor or be realized as a separate component.

For exposure measurement, the picture element is provided with an integrating photoreceptor device, similar to the ones found also in conventional clocked CMOS image sensors. Photoreceptor circuits are described, e.g., in Fossum E. R., "CMOS image sensors: Electronic Camera-On-A-Chip", Electron Devices, IEEE Transactions on, Vol. 44, Iss. 10, pp. 1689-1698, October 1997, in Noble P. J. W., "Self-scanned silicon image detector arrays" Electron Devices, IEEE Transactions on, Vol. 15, Iss. 4, pp. 202-209, April 1968, and in Chamberlain S. G., "Photosensitivity and Scanning of Silicon Image Detector Arrays," Solid-State Circuits, IEEE Journal of, Vol. 4, Iss. 6, pp. 333-342, December 1969. In a conventional CMOS pixel the photocurrent generated by a photodiode in response to impinging light intensity; is integrated onto a capacitor and the resulting electrical voltage is read out after a fixed period of time. In a conventional CMOS image sensor both beginning and end of this integration time are determined, common for all pixels, by external control signals.

According to the present invention, the point in time for starting an exposure measurement is not, as in conventional image sensors, derived jointly for all pixels and synchronously from an external time reference, but independently by each pixel for itself depending on the dynamic contents of the observed scene by detecting a change in light intensity. Essentially at the time of detection, the picture element transmits its address, typically an x,y-address in a rectangular pixel field of an image sensor array, independently via preferably an arbitrated asynchronous data channel, and usually initiates an exposure measurement. At the end of the exposure measurement, the picture element transmits its address again, preferably via a second, separate arbitrated asynchronous data channel.

In accordance with a favorable embodiment of the invention, it can be provided that, inside the picture element, the signal line connecting the circuit for the detection of changes and the device for exposure measurement for means of transmitting the signal that triggers the exposure measurement is disconnectable, whereby an external control line is intended for the control of the connection.

In accordance with a favorable embodiment of the invention, inside the picture element the signal line connecting the circuit for the detection of changes and the device for exposure measurement for means of transmitting the signal that triggers the exposure measurement is disconnectable, whereby an external control line is intended for the control of the connection.

In accordance with a favorable embodiment of the invention the device for exposure measurement comprises an integrating circuit with a threshold comparator and a circuit for the asynchronous and event-controlled transmission of the result of the exposure measurement as well as the picture element's address.

Advantageously a two-stage operational amplifier is used as the threshold comparator, in which by means of an additional transistor, the static current flow, and thus the power consumption of the circuit in the idle state is reduced to almost zero.

An additional advantage can be obtained by the fact that the threshold comparator alternately uses two (adjustable) threshold references. Each integration cycle is started with the first threshold reference connected to the reference input of the threshold comparator. After the comparator has detected that the integration signal has reached said first reference threshold, the second threshold reference is connected to the reference input of the threshold comparator while the integration continues. The measurement cycle concludes with the integration signal reaching the second threshold. The measurement result related to the integration cycle is encoded in the period of time between the two threshold crossings of the integration signal. At the time of each of the two threshold crossings, the address of the picture element is asynchronously transmitted. This method implements a true correlated double-sampling in the time domain and is able to suppress measurement errors caused by offset voltages and noise. The choice of which of the two thresholds to apply and the switching times are determined individually by the picture element based on the state of the change detection circuit and the circuit for exposure measurement.

Preferably two independent asynchronous bus arbiters and data transmission channels are foreseen in the image sensor separately for the circuit for detection of changes of intensity (transient detector) and the circuit for exposure measurement. Suitable asynchronous bus arbiter are described, e.g., in Boahen K., "Point-to-point connectivity between neuromorphic chips using Address Events", IEEE Transactions on Circuits and Systems II: Analog and Digital Signal Processing, vol. 47 pp. 416-433, 2000 and K. A. Boahen, "A burst-mode word-serial address-event link-I transmitter design," IEEE Transactions on Circuits and Systems I-Regular Papers, vol. 51, pp. 1269-1280, 2004.

In accordance with an optional feature of the invention the circuit for exposure measurement uses an integration circuit with adjustable integration time and the voltage output of the integration circuit is connected to an Analog-to-Digital converter (ADC). Appropriately the ADC is connected to a data transmission channel that is separate of the transmission channel used for the transient detector.

A preferred embodiment of the picture element according to the present invention is characterized by the fact that the circuit exhibits a transient detector for the detection of changes of intensity with an analog circuit for signal preprocessing and for asynchronous data transmission according to the "Address Event Representation" (AER) protocol. AER is described, e.g., in Boahen K., "Point-to-point connectivity between neuromorphic chips using Address Events", IEEE Transactions on Circuits and Systems II: Analog and Digital Signal Processing, vol. 47 pp. 416-433, 2000.

An image sensor for the generation of an image using a multitude of picture elements is, for the solution of the problem, characterized by the fact that the picture elements are implemented according to one of the preceding statements.

In accordance with a preferable embodiment this image sensor can be characterized by the fact that a circuit for the enforced initiation of an exposure measurement at least one picture element at an arbitrary point in time is provided.

An embodiment of an image sensor according to the present invention is characterized by the fact that the picture elements are arranged in parallel lines and that the circuit for the enforced initiation of an exposure measurement is laid out such that the first picture elements of each line can be stimulated essentially at the same time and, after the end of the individual exposure measurement of each of these picture elements, the respective next picture element of the same line is stimulated, and so on.

With all of the embodiments mentioned, further modifications are possible in the context of the invention. For example the transient detector circuit can be complemented with a device for adjusting a leakage current in the circuit, which can be used for a temporarily random initiation of an exposure measurement in the same picture element. In addition, a circuit for the essentially simultaneous enforced initiation of exposure measurement for a group of picture elements can be implemented, whereby the members of this group of picture elements can be selected arbitrarily, preferably forming a regular pattern or a continuous range.

BRIEF DESCRIPTION OF THE DRAWINGS

In the following the invention is described to further detail on the basis of preferred embodiments and with references to the attached drawings.

Figure 1A:
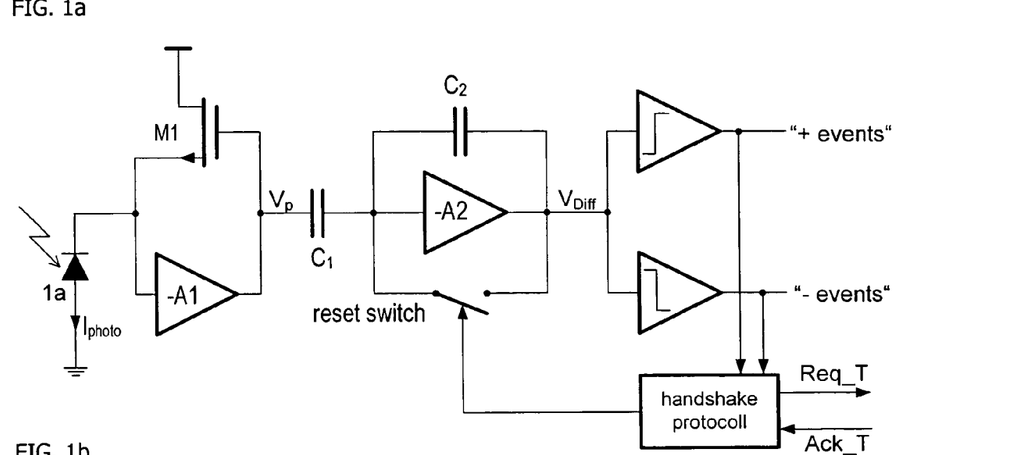
FIG. 1a shows a simplified diagram of the transient detector for detecting changes in light intensity.
Figure 1B:
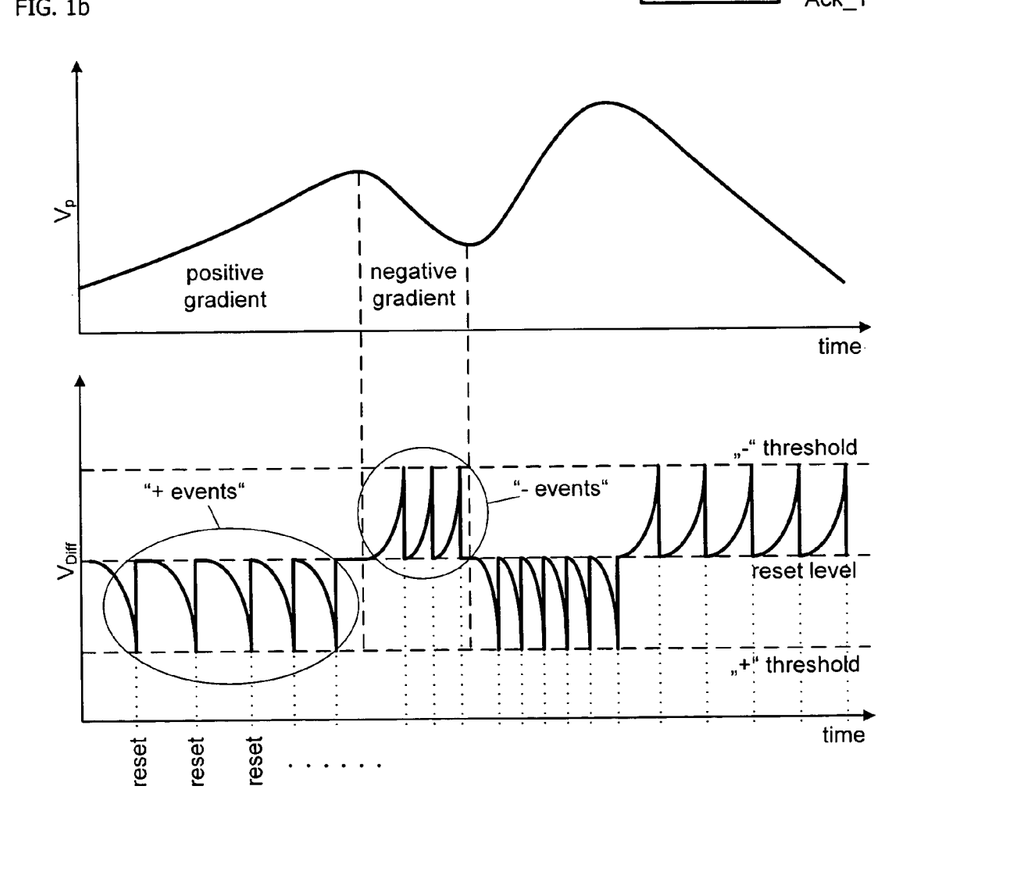
FIG. 1b depicts typical signal waveforms of the transient detector.

A simplified diagram of a transient detector (state of the art) is shown in FIG. 1a, whereby in FIG. 1b the typical signal processes arising therein are shown. The input signal to the transient detector is the current $I_{photo}$ flowing through transistor M1 and the photodiode 1a. In a feedback inverting amplifier arrangement A1 the photocurrent is converted into a voltage signal $V_p$. Changes of $V_p$ are amplified by the capacitively coupled inverting amplifier A2 and appear as a deviation from a defined voltage level (operating point after a RESET event) at the point $V_{Diff}$. If the signal $V_{Diff}$ crosses certain adjustable threshold levels which is detected by one of two voltage comparators, a RESET signal is briefly activated, whereby a reset-switch is closed and the input node of the amplifier A2 is short-circuited to its output and the operating point of the amplifier is reset. These RESET pulses are used to generate REQUEST-signals (Req_T) to a bus arbiter (Arbiter_T, 5) which initiates and controls the transmission of data packets containing the address of the requesting pixel (x,y-address in the pixel array, so-called "address events"). In this way changes in photodiode illumination are detected and as a result, the address of the respective pixel is transmitted with low latency over an asynchronous data bus 7, thereby signaling the coordinates in space and (inherently) in time of the detected change. The rate of change is encoded in the time intervals between multiple detection events (see FIG. 1b), the direction of change (going brighter or darker) for each event is determined by which one of the two comparators fire ("+" or "−" event). The described circuit, together with other circuit blocks, is used in the picture element that is a subject of the present invention.

Figure 2:
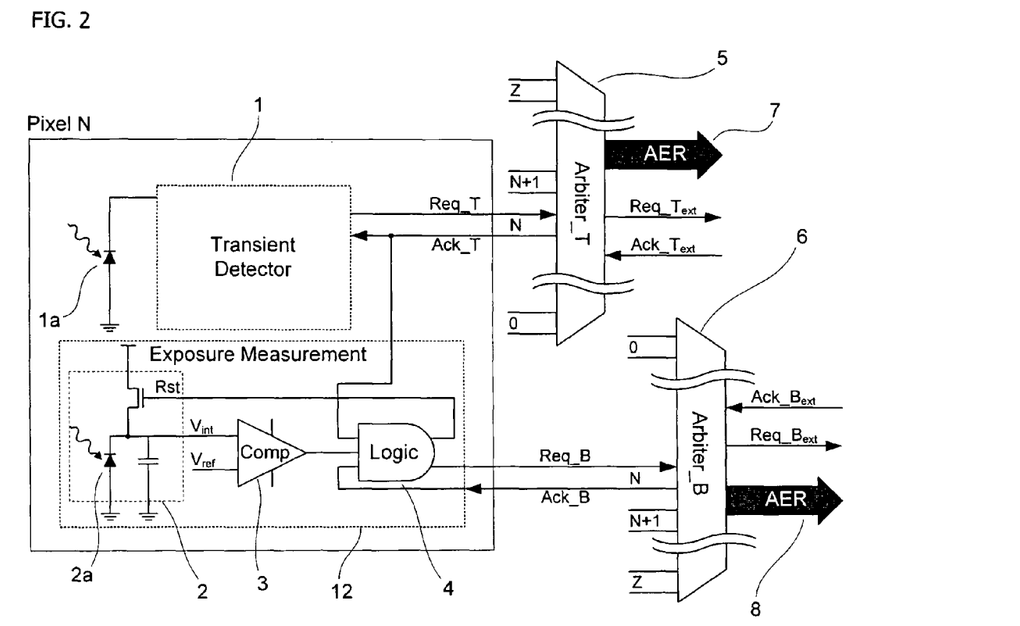
FIG. 2 shows a block diagram of a picture element according to the invention with asynchronous bus arbiters in a first embodiment.

The picture element according to the invention, shown in FIG. 2, is preferably implemented in CMOS technology and uses photodiodes 1a, 2a as light-sensitive devices. The picture element for an image sensor built up from a multiplicity of picture elements essentially consists of a transient detector 1 and an integrating photoreceptor circuit 2. The photoreceptor 2, complemented with a threshold comparator 3 and a logic circuit 4, forms the unit for exposure measurement 12 which implements the transformation of the photoreceptor exposure information into a time period. Circuit 4 is responsible for controlling the status of the exposure measurement and for the asynchronous transmission of the pixel signals, and hence of the result of the exposure measurement, to the address encoder and bus arbiter. The transient detector 1 can be configured such that it initiates an exposure measurement in 12 after it has detected a change in pixel illumination.

In order to realize an image sensor, multiple picture elements are placed in an arbitrary two-dimensional arrangement (typically a square matrix). The complete image data acquisition system consists of the image sensor, a data processing device and a memory unit. In the data processing device the result of each exposure measurement, a period of time between two address events, is converted to a digital number, typically by means of a digital counter. The memory unit contains (at least) one memory cell for each picture element in the imager array. In this memory, the grayscale image is stored and is continuously updated with new grayscale values on a pixel-by-pixel basis, whenever a change has been detected by one of the autonomously operating pixel and a new grayscale value has been measured and asynchronously transmitted. The current grayscale image data, a full frame or arbitrary parts of it, can be read out from the memory at any time, parallel to the continuous image acquisition, at an arbitrary rate.

The data from the picture elements are transmitted via asynchronous bus arbiters 5, 6 and asynchronous data buses 7, 8 to a data processing unit, where the individual packets (address events) are provided with a time signature. Separate bus arbiters 5, 6 and data buses 7, 8 can be used for the transient detector and the exposure measurement parts of the image sensor. An asynchronous "handshake"-protocol based on Request (Req) and Acknowledge (Ack) signals between image sensor and data processing unit can be implemented.

Alternatively the time stamps can be already assigned to the events at the sensor (pixel-level) and be transmitted over a synchronous bus arbiter and data bus.

In the following the function of a picture element and an image sensor according to the present invention is described. The transient detector 1 of a pixel detects a relative change in light intensity that exceeds an adjustable threshold, and produces a pulse signal which is turned into an address event by an address encoder. That means that at (or shortly after) the time of a change detection, the pixel puts its address, typically the x,y-address in the rectangular pixel array of the image sensor, onto the asynchronous data bus. At the same time an exposure measurement cycle (integration) is started in the exposure measurement part by briefly closing the "RESET"-switch (transistor Rst in the photodetector circuit 2). After the end of the integration, characterized by the fact that the integrated voltage at the capacitor of the photoreceptor circuit 2 has reached an adjustable threshold value $V_{ref}$ (the fact of which is detected by a threshold comparator 3), a second address event is generated and put on the data bus. Both address events carry the same pixel address, can however be discriminated by an additional identification bit. The time between the two events is proportional to the average current through the photodiode 2a during this time and hence to the exposure of the picture element.

The asynchronous signals for controlling the exposure measurement are derived (in normal operation mode) by the logic circuit 4 from the "handshake"—signal Ack_T of the transient detector 1, "handshake"—signal Ack_B of the exposure measurement part 12 and the output signal of the threshold comparator 3.

Both event types (change detection event and "end-of-integration" event) are generated asynchronously and data-driven and are transferred to the digital data processing unit over asynchronous bus arbiters 5, 6. Correlation (i.e. identification of the matching address event pairs) and time-to-digital conversion (TDC) takes place in the digital data processing unit. The use of two separate bus arbiters reduces non-uniform arbiter latencies due to event collisions and resulting timing inaccuracies.

The threshold comparator 3 is implemented using a voltage comparator with adjustable voltage thresholds, whereby the voltage reference can be generated outside of the pixel array. The time difference $t_{int}$ between the change detection event (which in turn starts the exposure measurement), and the time of the integration voltage reaching the threshold value $V_{ref}$ is a measure for the exposure of the picture element. This time depends on the size of the integration capacitor in the photodetector circuit 2, the photocurrent $I_{ph}$ flowing through photodiode 2a in response to the impinging light, as well as the voltage level $V_{start}$ at the integration capacitor $C_{int}$ at the beginning of the integration:

$$t_{int} = \frac{C_{int}}{I_{ph}} \cdot (V_{start} - V_{ref})$$

Random temporal variations of the voltage levels $V_{start}$ and $V_{ref}$ (voltage noise, kTC noise), or differences of these voltages across different picture elements ("Fixed Pattern Noise", FPN) can lead to different integration times for the same exposure in different picture elements or multiple measurements in the same picture element. Additional errors can result from different offset-voltages of the comparator circuits in different picture elements. A significant improvement of the image quality regarding static and dynamic noise can be achieved by using the time difference between reaching two different voltage levels $V_{refH}$ and $V_{refL}$ at the integration capacitor as a measure for pixel exposure. Consequently the integration time amounts to:

$$t_{int} = \frac{C_{int}}{I_{ph}} \cdot (V_{refH} - V_{refL})$$

Static or dynamic deviations of the starting voltage $V_{start}$ consequently have no effects on the measured integration time. Likewise errors caused by offset voltage variations are effectively suppressed.

In accordance with the preferred embodiment of the invention, at the time of reaching the upper adjustable threshold value $V_{refH}$ that is applied to the threshold comparator 3 of the picture element at the beginning of the integration cycle, the address of the picture element is transmitted. At the same time the reference voltage applied to the comparator of the appropriate picture element is switched to a lower voltage $V_{refL}$ by toggling switch 13. The address of the picture element is transmitted again when the voltage at the integration capacitor reaches the second threshold $V_{refL}$, whereby the two addresses can be discerned by adding an additional identification bit. The time difference between the times of reaching the two reference voltages $V_{refH}$ and $V_{refL}$ is used as a measure for the exposure of the picture element.

Figure 7:
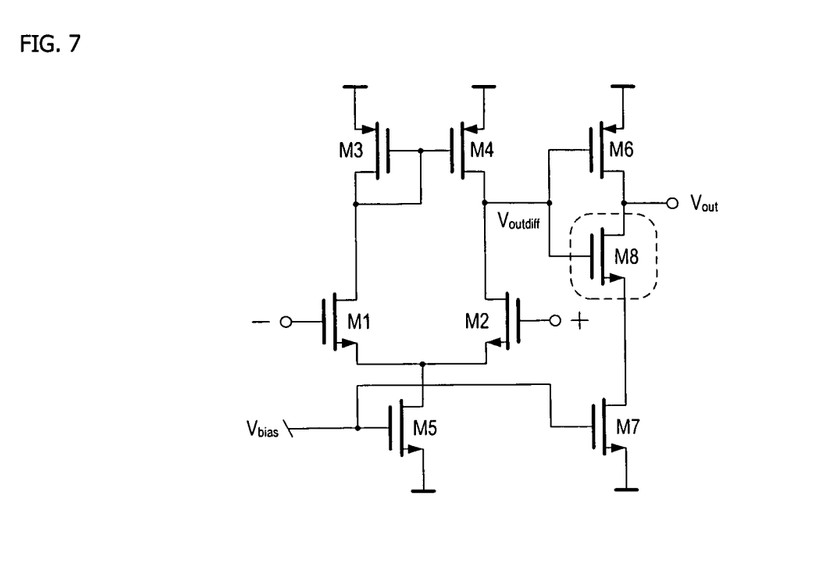
FIG. 7 shows a schematic diagram of a threshold comparator according to the invention.

For the threshold comparator (voltage comparator), a differential pair amplifier (M1-M5) with a downstream inverting common-source amplifier (M6, M7) can be used (two-stage operational amplifier, FIG. 7), whereby the voltage over the integration capacitor of the photodetector circuit 2 is applied to the negative (−) and the reference voltage to the positive (+) input of the comparator circuit. If the voltage at the negative input is smaller than the voltage at the positive input, the output voltage of the comparator approaches the supply rail (VDD), otherwise it is close to 0V (GND). An additional transistor M8 (see FIG. 7) is added to the second stage of this well-known two-stage operational amplifier in order to reduce the static current flow in the voltage comparator in its idle state to nearly zero (characterized by a voltage smaller or equal 0V at the integration capacitor of the photodetector circuit 2). In the differential pair this is inherently the case for said idle state, since the current flow is interrupted by the transistor M5. The voltage at the output of the differential pair in idle state goes to $V_{outdiff} \approx 0V$, which would, without transistor M8, cause static current flow in the common-source stage that is determined by the load transistor M6 and the voltage applied to $V_{bias}$. By applying transistor M8, the current flow between the node $V_{out}$ and the transistor M6 can be interrupted while the output voltage of the differential pair is close to zero, without affecting the other functionality of the circuit.

In accordance with the preferred embodiment of the invention the output signal of the comparator must be prepared for asynchronous communication in an appropriate way within the picture element. Beyond that switching of the reference voltages for the comparator likewise has to take place within each picture element individually. Both functions are realized by means of the logic circuit 4.

In the following a possible functional structure of the logic circuit 4 is described for the realization of the embodiment based on the evaluation of the integration time between two different comparator threshold voltages, whereby the evaluation of the integration time up to reaching only one comparator threshold represents a special case, which is inherently implemented.

Figure 6:
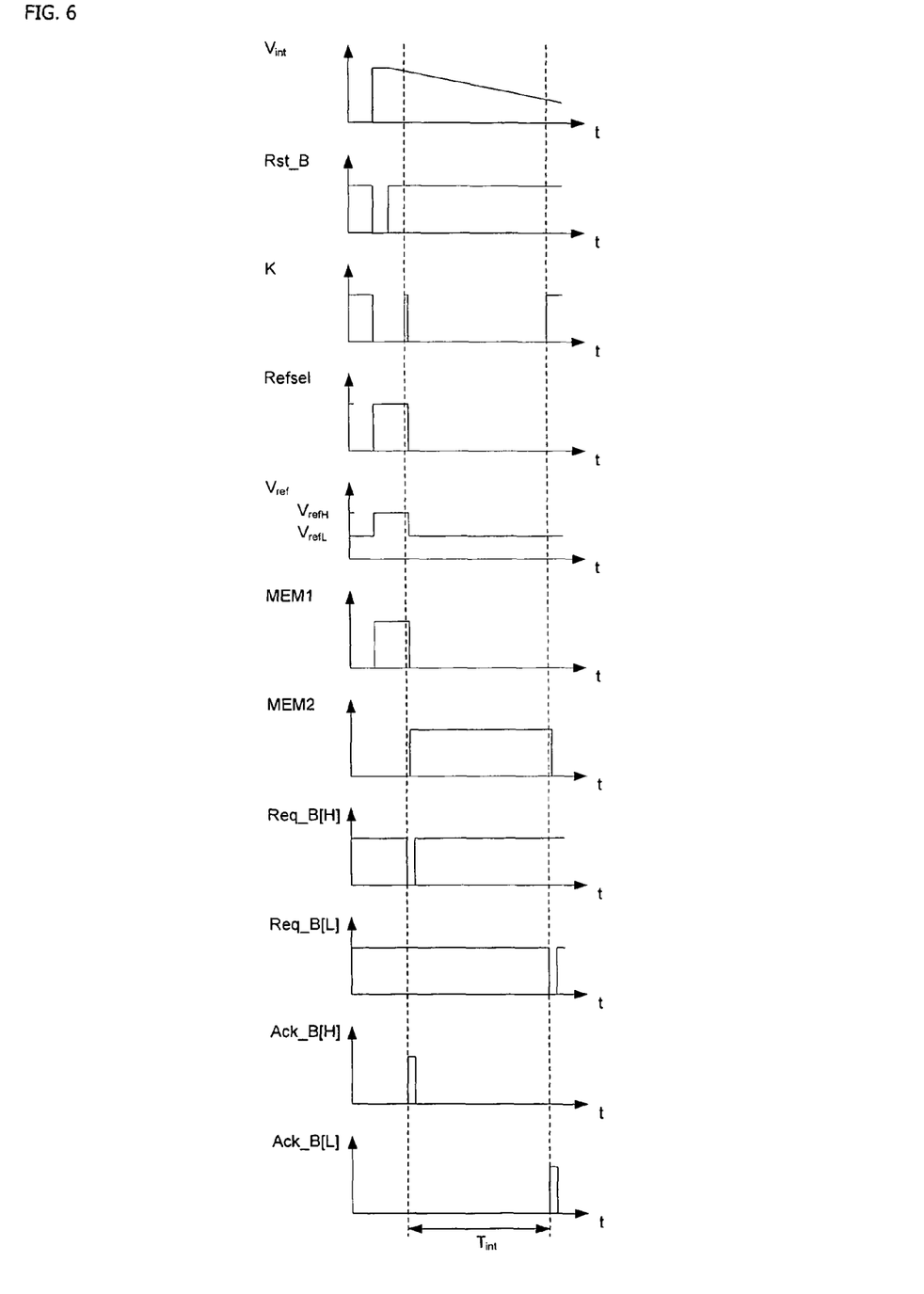

In FIG. 6 the relevant signals for an exposure measurement cycle are shown over time. With the reset of the integration capacitor of the photodetector 2, the logic circuit 4 is initialized at the same time and the appropriate switching signal Refsel for switch 13 for applying the upper reference voltage $V_{refH}$ to the comparator is generated. When the voltage at the integration capacitor of the picture element reaches $V_{refH}$ (signaled by the output K of the comparator) the handshake signal Req_B [H] is activated and reset after signal transmission by means of the acknowledgement signal Ack_B [H]. Concurrently the reference voltage at the comparator is switched to the lower reference voltage $V_{refL}$, which requires the change of the signal Refsel. Switching the signal Refsel can take place either at the time of the activation of Req_B [H] or, as implemented, is executed by the acknowledgement signal Ack_B [H]. When the integration voltage of the picture element (as signaled by output signal K of the comparator) reaches $V_{refL}$, a second request signal is activated. Again the signal Req_B [H] can be used for that purpose or, as implemented, a separate signal Req_B [L]. After signal transmission Req_B [L] is reset by means of the acknowledgement signal Ack_B [L]. This concludes one exposure measurement cycle.

For the case of single threshold operation (no noise and offset suppression desired), the lower reference voltage is simply set to a higher value than the upper reference voltage, thereby suppressing the generation of the second request signal.

Figure 5:
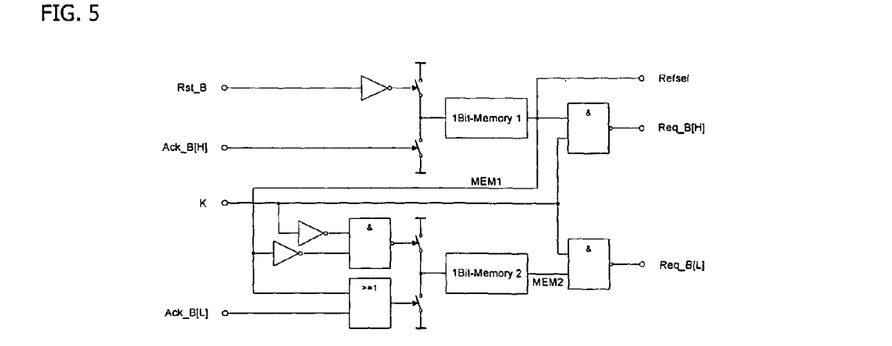

A possible realization of the logic circuit 4 of the preferred embodiment of the invention is shown as a gate level diagram in FIG. 5. Besides combinatorial elements two 1-bit-memory cells are used to encode the internal conditions of the picture element (integrating with integration voltage above the upper reference, integrating with integration voltage is below the upper and above the lower reference voltage, non-integrating). The state of the picture element is represented by means of the signals MEM2 and MEM1. The Rst signal as well as the Req_B [H/L]—signals are shown "active-low".

Since each pixel autonomously controls its own exposure time, a very wide range of processable light intensity and a high grayscale resolution are achievable. Since the achievable resolution depends on the signal-to-noise ratio and on the dynamic range, and hence on the integration swing determined by the adjustable thresholds and thus of the integration time and the minimum photocurrent, an increase of the picture actualization rate (in an overlaid synchronous video mode) causes a simultaneous decrease in dynamic range and gray-level resolution, and vice versa.

In the comparison to a pure transient sensor, composed of picture elements shown in FIG. 1, the data rate is increased by a factor of 2, however the image sensor according to the present invention in addition provides a grayscale image of high quality and very high temporal resolution. It can be estimated that, at a grayscale resolution of 8-bits, a temporal resolution in the sub-millisecond range can be achieved (corresponding to an image sensor delivering several thousand frames per second). The generated data rates depend on the dynamic contents of the scene and, according to previous experiences with the pure transient sensors, falls in the range of some 10 to some 100 kilo-events per second (assuming e.g. 16 bits per event and a 128×128 pixel sensor). The current grayscale image can be read out from the memory, depending on the application, at very high repetition rates. In an integrated CMOS "system on chip", the image memory, the correlation logic and the TDC transformation can be realized directly on the same silicon substrate as the sensor array.

Figure 3:
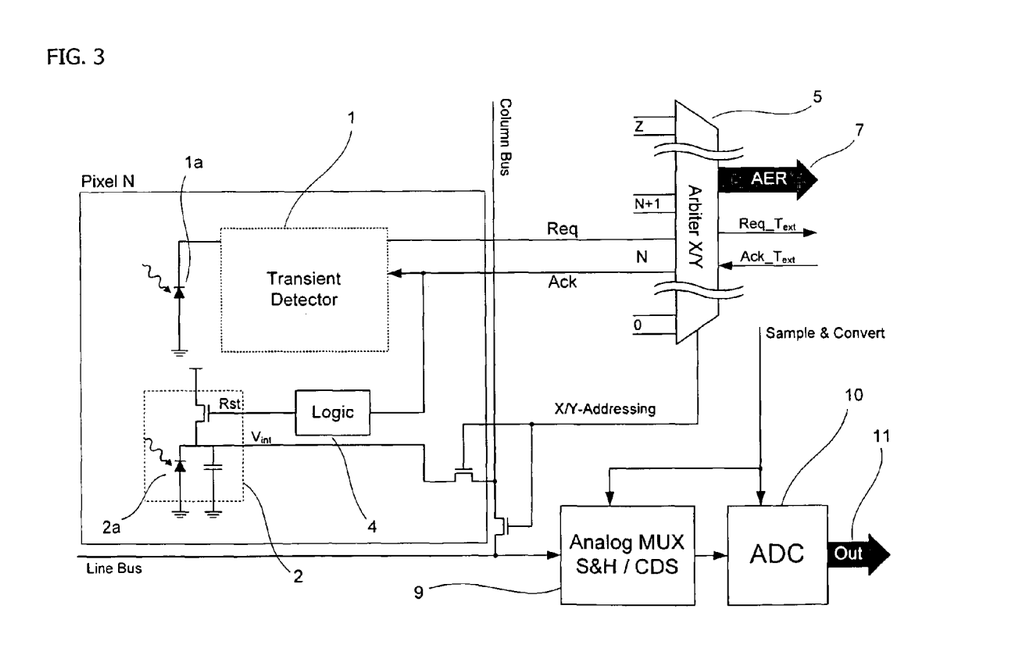
FIG. 3 is block diagram of a picture element with asynchronous arbiters, multiplexer/sample & hold and an ADC representing an alternative embodiment of the invention.

Instead of converting the exposure information into a variable length of time, alternatively, as in a conventional CMOS image sensor, the integration can be carried out for a given amount of time and the resulting voltage level can be converted by an analog-to-digital converter 10 and be transmitted. An exemplary circuit for an embodiment of a picture element according to the invention is represented in FIG. 3.

The exposure cycle is, as for the embodiment in FIG. 2, initiated asynchronously and event-controlled by the transient detector 1. The asynchronous "handshake"—signal of the transient detector 1, Ack_T, controls the reset signal, Rst, the exposure measurement unit 2 (by means of a logic circuit 4) as well as multiplexer/Sample & Hold 9 and analog-to-digital converter 10. The asynchronous bus arbiter 5 controls the addressing of the pixels in the pixel field.

In the following the function of this further embodiment is described. The transient detector 1 of a pixel detects a relative change in light intensity that exceeds an adjustable threshold, and produces a pulse signal which is turned into an address event by an address encoder. At the same time it starts an exposure cycle (integration) in the photodetector part 2. After the end of the integration, defined by a control signal (Sample& Convert), the output voltage of the exposure measurement unit 2 is taken by a Sample & Hold circuit 9 and converted by an analog-to-digital converter (ADC) 10. The grayscale data of the ADC 10 are sent via a separate data bus 11 for processing/storage. The address events from the transient detector are transmitted via an asynchronous bus arbiter 5 and data bus 7 to the data processing unit.

Image sensors composed of the picture elements described so far supply a complete picture with grayscale values for all of the picture elements only after a certain time. This stems from the fact that pixels, which detect no change in their field of view, generate no events and do not carry out an exposure measurement. For the determining of the parameters for the optimal transformation of the time information into image grayscale levels, the knowledge of the light intensity information of the entire scene is required. It is hence advantageous to be able to acquire an entire picture (reference frame) at arbitrary times. The data necessary for the TDC transformation ("offset", "range") can be extracted in a simple manner from the entity of grayscale values of the frame. Furthermore this functionality is appropriate in order to quickly dispose of a complete image of scenes with static background.

In principle several approaches to the acquisition of a reference frame are possible. In the simplest case the entire pixel field is stimulated externally and thus the integration is started at the same time in all pixels of the array. The pixel, which sees the strongest light intensity, sends the first event, followed by the remaining pixels in the order of their exposure ("time-to-first-spike"—concept). This concept is described, e.g., in Chen S.; Bermak, A., "A low power CMOS imager based on time-to-first-spike encoding and fair AER," *Circuits* and Systems, 2005. ISCAS 2005. IEEE International Symposium on, pp. 5306-5309 Vol. 5, 23-26 May 2005, in Chen S.; Bermak, A., "A Second Generation Time-to-First-Spike Pixel with Asynchronous Self Power-off," Circuits and Systems, 2006. 15015 2006. Proceedings. 2006 IEEE International Symposium on, pp. 2289-2292, 21-24 May 2006, in Qiang Luo; Harris, J. G., "A time-based CMOS image sensor," Circuits and Systems, 2004. ISCAS '04. Proceedings of the 2004 International Symposium on, vol. 4, IV-840-3 Vol. 4, 23-26 May 2004, in Q. Luo, J. G. Harris, A Time-Based CMOS Image Sensor, IEEE International Symposium on Circuits And Systems ISCASO4, 2004, in Xin Qi; Xiaochuan Guo; Harris, J. G., "A time-to-first spike CMOS imager," Circuits and Systems, 2004. ISCAS '04. Proceedings of the 2004 International Symposium on, vol._4, IV-824-7 Vol._4, 23-26 May 2004, or U.S. 6,660,989.

In the case of uniform scenes or scene parts many pixels reach the threshold at the same time and send their event essentially concurrently, resulting in data collisions at the bus arbiters and varying arbiter latencies and consequently non-systematic errors in the time difference between the time of the external stimulus and the associated exposure measurement events. The result is a deterioration of image quality.

Figure 4:
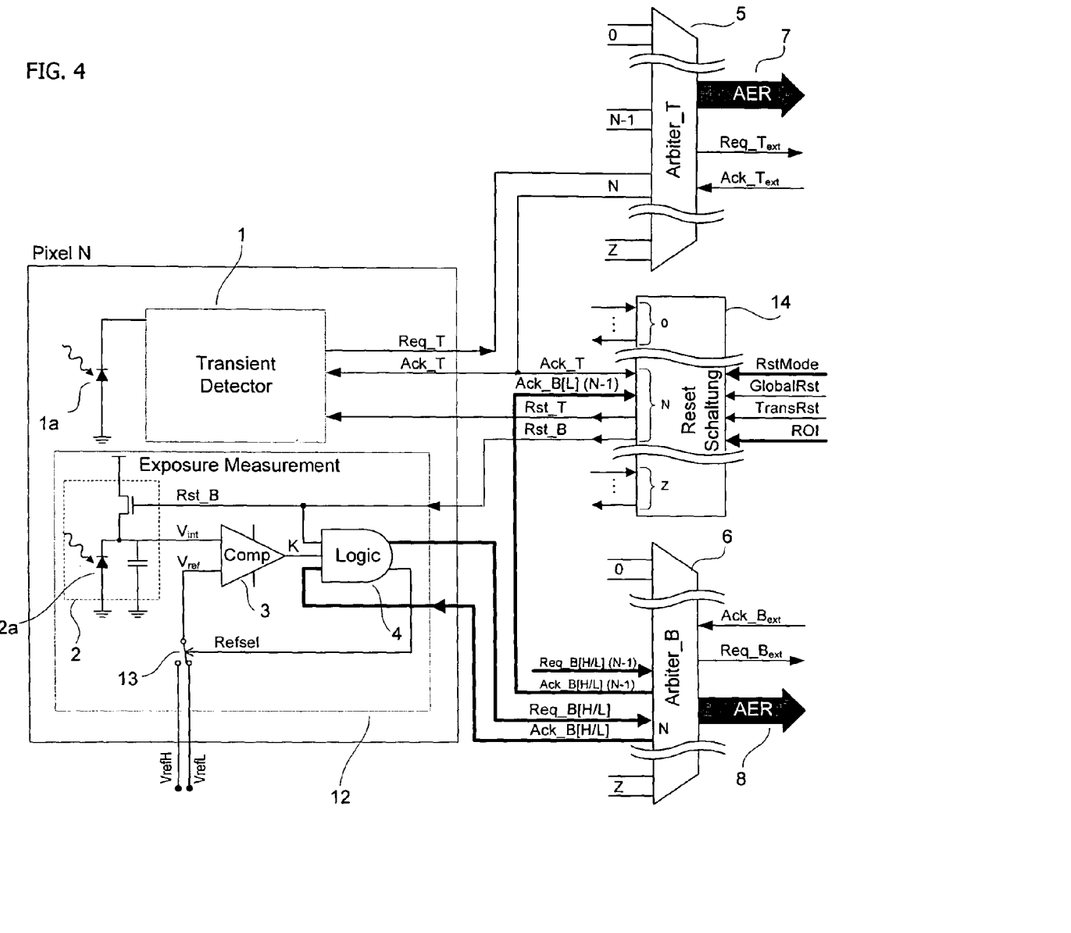
FIG. 4 shows a block diagram of a picture element with arbiters for an embodiment in accordance with FIG. 2, supplemented by details for the implementation of circuits for the flexible generation of stimuli for reference frame generation and synchronous video mode operation and the optional activation and/or deactivation of arbitrary regions-of-interest (ROIs) in the pixel array, FIG. 5. shows a block diagram of the logic device 4 in the exposure measurement part 12 of the pixel in FIG. 4, FIG. 6 contains a typical sequence of pixel logic signals.

To remedy these well-known disadvantages, different methods for starting the integration cycle of the exposure measurement unit 12, in the following called RESET, can be implemented according to the present invention (see FIG. 4). The generation of the RESET signals occur in the in the reset circuit 14 which is detailed in FIG. 8.

The most fundamental characteristic of the present invention is that in normal operation the initiation of the exposure measurement of a picture element is triggered by a change detection event of the transient detector of the same picture element.

Figure 8:
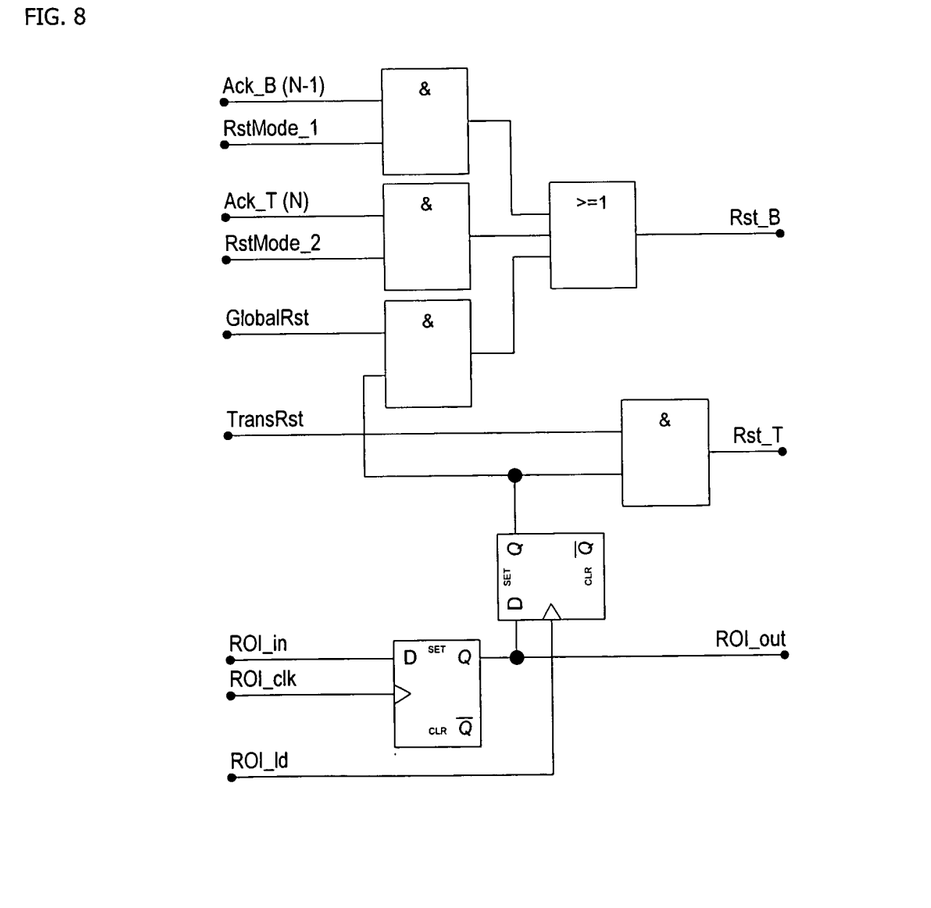
FIG. 8 is a block diagram of the reset circuit 14 in FIG. 4.

A further characteristic of the present invention is that the reset circuits 14 are implemented line- and column-wise, which leads to a substantial reduction in silicon area as compared to a pixel-level implementation. The reset circuit 14 preferably is identical for columns and lines and generates the RESET signals Rst_T (0 to Z) for resetting the transient detectors 1 and the RESET signals Rst_B (0 to Z) for resetting the exposure measurement units 12 for the respective columns and lines. The RESET signal of a certain pixel is derived from the logic AND operation of the Rst_T and/or Rst_B signals of the respective column and line which is carried out in the pixel. Alternatively, the RESET circuit can be realized also directly in each pixel.

A further characteristic of the invention is to limit the RESET to selected picture elements. The selection is affected by asserting the ROI signals (see FIG. 4.), loaded form, e.g., a shift register chain in order to activate or deactivate certain lines and/or columns. It is, e.g., possible to select arbitrary rectangular parts of the array as Regions-of-Interest (ROI) as well as other patterns like, e.g., every other line/column in order to reduce resolution and data volume. Alternatively the regions selected by the ROI can be inverted to implement Region Of Non Interest (RONI).

A further characteristic of the invention is it that the activation/deactivation described in the preceding paragraph can be used alternatively both for the RESET of the transient detector 1 and/or for the RESET of the exposure measurement 12. This leads to a variety of possibilities, which can be used in combination with the RESET mode signal RstMode, which is described in the next section.

The selection of the respective RESET mode is accomplished by one or more control signals RstMode. In the following the different RESET modes resp. modes of operation are discussed:

Normal Operating Mode

In the normal operating mode the exposure measurement of a pixel is initiated by the transient detector 1 of the same pixel. Preferably the RESET of the exposure measurement is effected by the acknowledge signal Ack_T of the transient detector 1 which is produced by the Arbiter_T 5.

Independent Mode

In the independent mode the exposure measurement works independently of the transient detector and can be activated, e.g., for the acquisition of a reference frame, by a global array RESET, as described below.

Sequential Mode

The sequential mode is used to suppress event collisions in the event arbiters that frequently occur with uniform scenes in the independent global-RESET mode. In the sequential mode the exposure measurement of a picture element is initiated by the end of the exposure measurement of the preceding picture element of the same line. This is obtained by using the Ack_B (N−1) signal of the Arbiter_B 6. Hence the start of the exposure measurement of the pixel in the following column is independent of a detected change in the scene. For example if the exposure measurement of the entire first column of the pixel field is started, this leads to sequential exposure measurements of the pixels in all lines, whereby the exposure measurements of the pixels of the individual lines are independent from each other. By using the Ack_B (N−1) signal, which signals the end of the exposure measurement of the preceding pixel, the delay depends on the exposure of the preceding pixel, leading to a non-uniform delay and thus to a more even arbiter load. A permutation of columns and lines leads to analogous results.

Random Mode

In random mode the effect is used that repeated identical realizations of semiconductor elements or structures on a chip are subject to dispersions in the manufacturing process parameters. In accordance with the preferred embodiment of the invention the dispersion of the leakage current of the switch transistors of the transient detectors 1, are used to draw a current at the junction between C1, C2 and the input of the amplifier A2 that is stochastically distributed between the different pixels. The size of the leakage current of the transistor can be affected by the transistor's bulk potential. As a consequence of this leakage current, spurious event are generated in the transient detector, whose times of occurrence are randomly distributed between pixels and whose rate can be controlled by said bulk potential. The events of the transient detector, as in the normal operating mode, initiate the respective exposure measurement. As a consequence, the sensor grayscale data are updated coincidentally but at an adjustable rate.

Independently of the selection of operating modes as mentioned above, the possibility of activating/deactivating the exposure measurement for a group of pixels (ROI/RONI) results in the following possibilities:

Global start of the exposure measurement: For the pixels selected by the ROI the exposure measurement is started at the same time by a pulse at the GlobalRst signal. This method allows a very fast image acquisition for the entire ROI, can however lead to data collisions at the arbiters.

As a substantial characteristic of the invention the global RESET can be used in the normal operating mode to update the image (or parts of it) at arbitrary times if desired.

In the sequential mode activation of the global RESET for the first column leads to a line-wise sequential column-parallel collection of the entire image, as described above.

Deactivation of transient detectors: The transient detectors of the pixels selected by the ROI can be deactivated by asserting the TransRst signal. Thus, the selected transient detectors do not generate events and trigger no exposure measurement. This can be used to deactivate parts of the sensor and implement, e.g., a (multiple) line-sensor mode.

The invention claimed is:

1. A method for generating a greyscale map or image of a scene in electronic form by picture elements, comprising the steps of:
   measuring exposure at one individual picture element of said picture elements by a first light-sensitive circuit,
   transmitting a result of said measurement for at least one of storage and subsequent processing, and wherein:
   said exposure measurement is initiated by an independent and asynchronous detection of a change in light intensity in a field of view of said individual picture element,
   said independent and asynchronous detection of a change in light intensity is done by a second light-sensitive circuit of the said picture element, and
   said result of the measurement and the address of the said picture element are transmitted asynchronously.

2. The method of claim 1, whereby the information about the detection of a change in light intensity and the information containing the result of the exposure measurement are transmitted concurrently and independently of each other.

3. The method of claim 1, whereby in the course of an exposure measurement a resulting voltage level, proportional to a light dependent accumulating physical quantity after integration for a given period of time, is determined and considered to encode the instantaneous exposure information of the picture element.

4. The method of claim 1, including the steps of:
   determining an end of said exposure measurement by establishing a point in time when a light dependent accumulating physical quantity in the picture element reaches an adjustable threshold value,
   at said point in time, transmitting an address of the said picture element asynchronously for at least one of storage and subsequent processing, and
   wherein the time period between detection of said change of light intensity and reaching said threshold value is considered to encode the instantaneous exposure information of the said individual picture element.

5. The method of claim 1, including the steps of:
   determining a first point in time when, in the course of one exposure measurement, a light dependent accumulating physical quantity in the picture element reaches a first adjustable threshold value,
   at said first point in time transmitting the address of said picture element,
   determining a second point in time when, subsequently, said light dependent accumulating physical quantity in the picture element reaches a second adjustable threshold value, and
   at said second point in time, transmitting the address of said picture element, wherein the time period between the events of reaching said two threshold values is considered to encode the instantaneous exposure information of the said picture element.

6. The method of claim 1, wherein a transmission of the address of the picture element signals the time of said detection of a change in light intensity.

7. The method of claim 1, wherein said second light-sensitive circuit for the detection of changes in light intensity can be jointly enabled or disabled for a group of picture elements.

8. The method of claim 1, wherein an exposure measurement at one individual picture element can be initiated externally at least at one arbitrary point in time.

9. The method of claim 8, wherein an exposure measurement in parallel lines of picture elements in an array is initiated at the first individual picture element of said lines essentially at the same time, and wherein at the end of the exposure measurement of each individual picture element, the exposure measurement at the next individual picture element of the same line is initiated.

10. The method of claim 8, whereby a reference exposure measurement is executed at the same time and independently of the detection of changes in light intensity by the picture elements.

11. A picture element for an image sensor for the generation of an image of a scene in electronic form, comprising a first light-sensitive circuit for measuring exposure, a second light-sensitive circuit for detecting changes in light intensity, a circuit for controlling the status of the picture element and for asynchronously and event-based transmitting the result of the exposure measurement and of the address of the picture element to a bus arbiter,
   wherein said second light-sensitive circuit generates (i) a signal which initiates exposure measurement in said first light-sensitive circuit and (ii) a signal to initialize circuit which controls the status of the picture element and the asynchronous and event-based transmission of the result of the exposure measurement and of the address of the picture element to a bus arbiter.

12. An image sensor for the generation of an image in electronic form comprising a multiplicity of picture elements of claim 11.

13. The image sensor of claim 12 comprising a circuit for externally initiating an exposure measurement at an arbitrary point in time within at least one picture element.

14. The image sensor of claim 12, wherein the picture elements are arranged in parallel lines and wherein the circuit can be configured to initiate an exposure measurement in the first picture elements of all lines essentially at the same time and individually for each line to initiate an exposure measurement in the second picture element as soon as the first picture element has finished its exposure measurement, and to proceed analogously until the last pixel in each line has completed an exposure measurement, thereby administrating sequential exposure measurements of all pixels in all lines, whereby the exposure measurements of the pixels of the individual lines are independent from each other.

15. The picture element of claim 11, wherein the signal line from the second light-sensitive circuit to the first light-sensitive circuit and to circuit are disconnected, and including an external control line for the initiation of the first light-sensitive circuit and the circuit.

16. The picture element of claim 11, wherein the first light-sensitive circuit comprises an integration device with threshold comparator and constitutes one unit in combination with circuit.

17. The picture element of claim 16, wherein one of two externally generated reference voltages are selectable for being used with the threshold comparator and whereby circuit controls the switch for selecting one of the two threshold voltages.

18. The picture element of claim 16, wherein the threshold comparator comprises a two-stage operational amplifier and including an additional transistor M8 in the two-stage operational amplifier circuit to minimize static current flow in the voltage comparator in an idle state of the circuit.

19. The picture element of claim 11, wherein the first light-sensitive circuit comprises an integrating device with adjustable integration time and an analog-to-digital converter for the resulting integration voltage level.

20. The picture element of claim 11, wherein the second light-sensitive circuit comprises a transient detector with an analog circuit for signal preprocessing and for the asynchronous transmission of data using the address-event representation.

* * * * *